April 23, 1957     H. N. LIVINGSTON     2,790,146
VOLTAGE RATIO MEASURING APPARATUS
Filed April 2, 1952
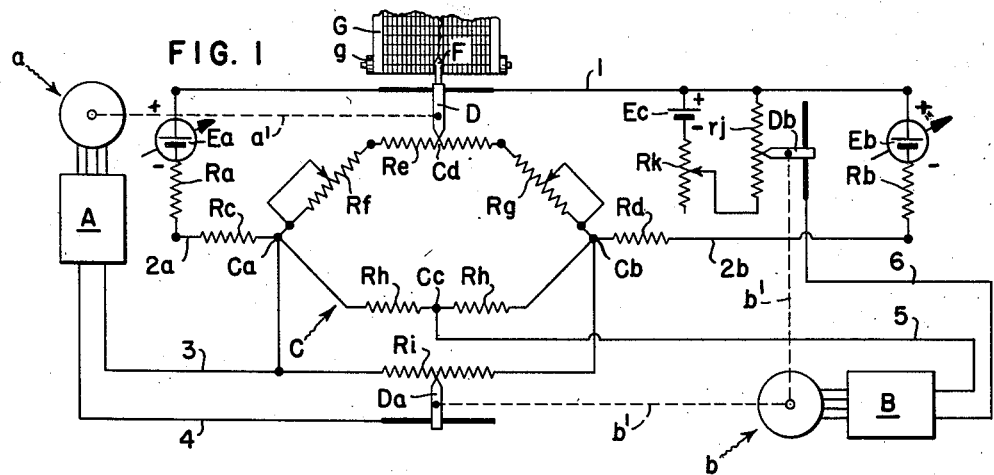
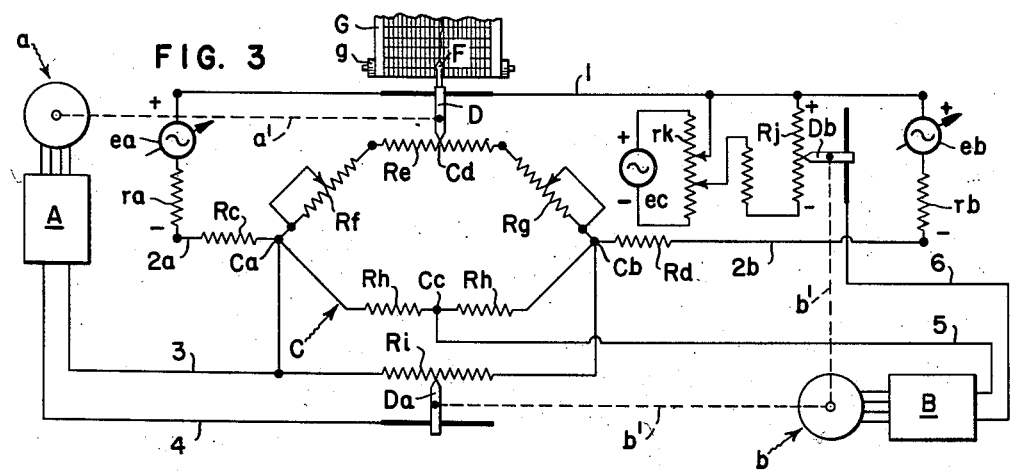
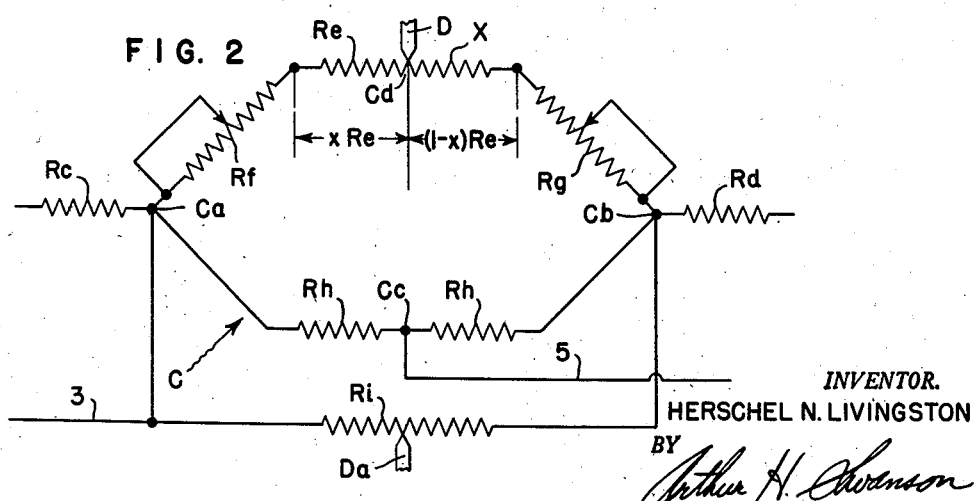
*INVENTOR.*
HERSCHEL N. LIVINGSTON
BY
*Arthur H. Swenson*
ATTORNEY.

United States Patent Office 2,790,146
Patented Apr. 23, 1957

2,790,146

VOLTAGE RATIO MEASURING APPARATUS

Herschel N. Livingston, Philadelphia, Pa., assignor to Minneapolis-Honeywell Regulator Company, Minneapolis, Minn., a corporation of Delaware Application April 2, 1952, Serial No. 280,025

10 Claims. (Cl. 324—140)

The general object of the present invention is to provide improved means for measuring the ratio of two variable quantities. More specifically, the object of the present invention is to provide a simple and effective measuring circuit network for continuously measuring, and for recording, when desired, the ratio of two electrical voltages each of which may vary widely. Those voltages may be unidirectional or alternating. When the voltages are alternating the phase relations in different portions of the measuring circuit network must be suitably related.

More specific objects of the invention are to provide a novel, simple and effective self-balancing ratio measuring apparatus, and to provide such apparatus with means for automatically varying the sensitivity of the rebalancing mechanism in response to variations in the magnitude of the difference between the two ratio voltages.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Fig. 1 is a direct current measuring circuit network;

Fig. 2 is a reproduction on a larger scale, of a portion of the network shown in Fig. 1; and Fig. 3 is an alternating current measuring circuit network.

In the form of the present invention shown by way of example in the drawings, the invention is used in measuring the ratio to one another of two unidirectional voltages $Ea$ and $Eb$. The voltage sources of $Ea$ and $Eb$, having respective internal series resistances $Ra$ and $Rb$, are connected in an opposing series circuit network to a normally balanced measuring bridge-circuit C. An electronic amplifier A, responsive to voltage variations in the circuit C produced by variations in the ratio to one another of voltages $Ea$ and $Eb$, is energized when the latter is unbalanced, and when so energized actuates a reversible rebalancing motor $a$ to adjust a wiper contact D along a slidewire resistor $Re$ in the direction and to the extent required to rebalance the said circuit. The slidewire resistor $Re$ is included in one branch of the bridge circuit C. A second amplifier B, responsive to voltage variations in the circuit network produced by variations in the voltages $Ea$ and $Eb$, controls the operation of a reversible motor $b$. The latter adjusts a second wiper contact $Da$ to vary the sensitivity of the amplifier A as the voltage level of the measured voltage ratio varies and provides compensation for the effect of the adjustments of the contact D on the difference between the potential of the conductor 1 and the potential of the circuit point $Cc$ in a second branch of the bridge circuit C. Each of the amplifiers A and B, and its associated motor $a$ or $b$, may be of the well known and widely used type of rebalancing apparatus disclosed and claimed in the Wills Patent No. 2,423,540 of July 8, 1947.

One terminal of the voltage source $Ea$ is connected to one terminal of the voltage source $Eb$ by the conductor 1, which may have a resistance too small to be of consequence. The second terminal of the voltage source $Ea$ is connected through a terminal conductor $2a$ to one energizing terminal or junction $Ca$ of the measuring bridge C. The second terminal of the voltage source $Eb$ is connected through a terminal conductor $2b$ to the second energizing terminal $Cb$ of the bridge circuit C. The bridge terminal conductors $2a$ and $2b$ include resistors $Rc$ and $Rd$, respectively. The branch of the bridge circuit C including the slide wire resistor $Re$ also includes regulable resistors $Rf$ and $Rg$ through which the ends of the resistor $Re$ are connected to the terminals or junctions $Ca$ and $Cb$ of the bridge circuit C.

Connected in parallel with the resistor $Re$ and its extensions $Rf$ and $Rg$ are second and third branches of the circuit C. The second branch includes two resistors $Rh$ of equal resistance connected in series with one another between the points $Ca$ and $Cb$, and the third branch includes a slide wire resistor $Ri$ connected between the points $Ca$ and $Cb$. The two resistors $Rh$ are connected to one another at the bridge circuit point $Cc$. The variable point along the resistor $Re$ engaged by the wiper contact D is designated $Cd$. The resistor $Ri$, which forms the third branch of the bridge circuit C, serves as a voltage divider through which a regulable portion of the voltage between the bridge circuit terminals $Ca$ and $Cb$ is impressed on the input circuit of the amplifier A. The latter has one input terminal 3 directly connected to the end of the resistor $Ri$ connected to the bridge point $Ca$. The second input terminal 4 of the amplifier A is connected through the wiper contact $Da$ to the point in the voltage divider $Ri$ engaged by the contact $Da$.

The wiper contact D serves as a bridging conductor to connect the conductor 1 to the slide wire resistor $Re$ at the variable point $Cd$ of the latter engaged by the wiper contact D. The latter is adjusted by the motor A through an operating connection $a'$. The amplifier B operates through its motor $b$ and operating element $b'$ to adjust the contact $Da$ in the direction to vary the portion of the voltage difference between the bridge junctions $Ca$ and $Cb$ impressed on the input circuit of the amplifier A.

The amplifier B is directly responsive to any potential difference developed between the point $Cc$ at which the adjacent end of the two resistors $Rh$ are connected to one another, and the wiper contact $Db$ which engages and is adjustable along a slide wire resistor $Rj$. The latter is a voltage divider with one terminal directly connected to the conductor 1, and having its second terminal connected to the conductor 1 through a regulable resistor $Rk$ and a source of unidirectional voltage $Ec$, which may be a dry cell or other battery. The input terminals 5 and 6 of the amplifier B are connected to the bridge circuit point $Cc$ and the wiper contact $Db$, respectively. When a voltage difference is developed between the bridge circuit point $Cc$ and the wiper contact $Db$, the bridge circuit C is unbalanced, and the amplifier B is energized. The amplifier B, when thus energized, operates the motor $b$ which through its operating element $b'$ adjusts the slider contact $Db$ in the direction and to the extent required to restore equality between the potential of the wiper contact $Db$ and the bridge point $Cc$. Through its operative element $b'$, the motor $b$ when energized by the amplifier B, also adjusts the wiper contact $Da$ to thereby vary the portion of the voltage across the voltage divider $Ri$ which is impressed on the input circuit of the amplifier A. The overall effect of the amplifier B is to increase and decrease the sensitivity of the amplifier A as the potential difference between the bridge terminals or junctions $Ca$ and $Cb$ decreases and increases respectively.

The motor $a$ which adjusts the contact D along the slide wire $Cd$ may also be employed to adjust the recording element of a recorder. Thus as is diagrammatically shown in Fig. 1, the wiper contact D may be mechanically connected to a recording pen or other recording element F which traces a record on a strip chart G. As shown the latter is advanced by a feed roll $g$ having its axis parallel to the line of movement of the contact D and continuously rotating at a constant speed.

As shown in Fig. 2, $x$ and $1-x$ are proportional to the lengths of the portions of the resistance $Re$ at the left and right hand sides, respectively, of the point in the resistor $Re$ engaged by the contact D. When the point is midway between the ends of the resistor $Re$, $x=1-x$, and $x$ is then equal to .50.

When the measuring bridge-circuit C has been adjusted to its null or balanced condition, it can be shown the equation for the input voltage ratio $$\frac{Ea}{Eb}$$

versus per unit slidewire resistance $x$ will be that given by the following Equation 1:

$$\frac{Ea}{Eb} = \frac{(Re+Rg)(Ra+Rc+Rf)+Re(Re+Rg-Rc-Rf)x-Re^2x^2}{Rf(Re+Rg+Rb+Rd)+Re(Re+Rg+Rb+Rd-Rf)x-Re^2x^2} \quad (1)$$

In the use of the invention, calculations will be simplified for most application where $Rc+Ra$ can be made equal to $Rd+Rb$, and $Rf$ can be made equal to $Rg$. In such case, the ratio $$\frac{Ea}{Eb}$$

will be equal to unity when $x=0.50$, i. e. when contact D is in its mid-scale position, and the equation at null-balance will be that given by the following Equation 2:

$$\frac{Ea}{Eb} = \frac{(Re+Rf)(Ra+Rc+Rf)+Re(Ra+Rc-Re)x-Re^2x^2}{Rf(Re+Ra+Rc+Rf)+Re(Ra+Rc+Re)x-Re^2x^2} \quad (2)$$

As previously stated, the present invention can be used in measuring the ratio of alternating voltages, provided their frequencies are identical and provided proper phase relations are maintained in different portions of the circuit network. In Fig. 3 I have illustrated by way of example, a measuring circuit network which is similar to the circuit network shown in Figs. 1 and 2, except that the voltages $ea$, $eb$ and $ec$ are alternating voltages. To illustrate the necessary phase relations of the voltages $ea$, $eb$ and $ec$, I have applied conventional plus and minus symbols to the terminals of the alternating voltage sources, which may be positive and negative at the same instant. Except for the necessity of insuring the proper phase relations of the voltages $ea$, $eb$ and $ec$, the circuit network shown in Fig. 3 may be similar to the circuit network shown in Figs. 1 and 2. In consequence, all of the reference symbols in Fig. 3, other than the symbols $ea$, $eb$, $ec$, $ra$, $rb$, and $rk$, may be identical with the symbols applied to corresponding portions of the network shown in Figs. 1 and 2.

The resistors $ra$ and $rb$ of Fig. 3 may be resistors similar to the resistors $Ra$ and $Rb$ of Fig. 1.

As diagrammatically shown, the voltage sources $ea$ and $eb$, having respective internal series resistances $ra$ and $rb$, are connected in an opposing series circuit network. The alternating currents flowing through the voltage sources $ea$ and $eb$ must be of the same frequency and so phased that the terminals connected to conductor 1 are of the same polarity, as is indicated in Fig. 3.

As shown, voltage $ec$ is provided by connecting the voltage divider $Rj$ in series with a small adjustable portion of a voltage divider $rk$, through which a constant alternating current flow is shown diagrammatically as an alternating current generator. The frequency of the current flowing through the voltage divider $rk$ must be the same as the frequencies of the currents flowing through the voltage sources $ea$ and $eb$, and the phase of the current flowing through the voltage divider $rk$ should be such as to give the terminal of the resistor $rj$ connected to the conductor 1, the same polarity as the terminals of the voltage sources $ea$ and $eb$ connected to said conductor.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. Apparatus for measuring the ratio of two voltages supplied by sources of independently variable voltages, each of said voltage sources including an internal impedance and means for equalizing the input impedances from said voltage sources to said apparatus, comprising in combination, an electrical circuit including two branches, a pair of terminals between which each of said branches is connected, a slide wire resistor included in one of said branches, a rebalancing wiper contact engaging and adjustable along the length of said slide wire resistor, means connecting one of said voltage sources between said contact and one of said terminals, means for connecting the other of said voltage sources between said contact and the second of said terminals, and electric signal utilization means connected to respond to the potential difference between said terminals and having an output connection to said wiper for mechanically adjusting said wiper contact along said slide wire resistor in one direction or in the opposite direction as the potential difference between said terminals respectively increases and decreases.

2. Apparatus as specified in claim 1, including a variable resistor which connects one end of said slide wire resistor to one of said terminals points.

3. Apparatus as specified in claim 1, including one adjustable resistor which connects one end of said slide wire resistor to one of said terminals, and including a second adjustable resistor which connects the other end of said slide wire resistor to the second of said junction points.

4. Apparatus as specified in claim 1, in which said variable voltage sources supply alternating voltages of the same frequency and in which the voltages of the terminals of said sources connected to said rebalancing wiper contact are of the same phase.

5. Apparatus as specified in claim 1, including rebalancing means comprising an amplifier responsive to variations in the potential difference between said terminals, and a motor actuated by said amplifier to adjust said rebalancing wiper contact in one direction or the other as the potential difference between the terminals respectively increases and decreases.

6. Voltage ratio measuring apparatus comprising, two sources of independently variable voltages, each of said voltage sources including an internal impedance and means for equalizing the imput impedances of said voltage sources to said apparatus, a first slide wire resistor having two end terminals and an adjustable slider, means connecting one of said sources between said slider and one of said end terminals, means connecting the other of said sources between said slider and the other of said end terminals, a second slide wire resistor connected to said end terminals and having an adjustable slider, and rebalancing means comprising an amplifier having an input connected between one of said end terminals and the slider of said second slide wire resistor, said rebalancing means having an output mechanically connected to adjust the slider of said first slide wire resistor until the voltage on the input of said amplifier is balanced which adjustment will be dependent on the respective magnitudes of the voltages of said sources.

7. Apparatus as defined in claim 6 including mechanism connected to mechanically adjust the slider of said second slide wire resistor in response to variations in potential between the slider of said first slide wire resistor and a potential point intermediate said end terminals to vary the magnitude of the input signal to said amplifier.

8. Voltage ratio measuring apparatus comprising, two sources of independently variable potentials, each of said potential sources including an internal impedance and means for equalizing the input impedances to said apparatus, a first slide wire resistor having two end terminals and a first cooperating slider, means connecting one of said sources between said first slider and one of said end terminals, means connecting the other of said sources between said slider and the other of said end terminals, a pair of resistors connected in series with each other between said end terminals, a second slide wire resistor connected between said end terminals and having a second cooperating slider, rebalancing means including an amplifier having an input signal derived from said second slider and one of said end terminals and an output connection disposed to position said first slider until the signal on the input of said amplifier is balanced, and adjusting mechanism including an amplifier having an input signal derived from the junction of said series connected resistors and said first slider and an output disposed to position said second slider so that the sensitivity of said rebalancing means may be varied in accordance with the position of said first slider.

9. Apparatus as defined in claim 8 wherein said adjusting mechanism includes an adjustable source of potential connected in said amplifier input and adjusted by said output to balance the input to the amplifier of said adjusting mechanism.

10. Apparatus as defined in claim 9 wherein all of the sources of potential are alternating current and are phased so that the connections thereof to said first slider are the same.

References Cited in the file of this patent
UNITED STATES PATENTS

| | | |
|---|---|---|
| 2,389,939 | Sparrow | Nov. 27, 1945 |
| 2,522,976 | Williams | Sept. 19, 1950 |